July 5, 1938.      H. F. PATTERSON      2,122,488
POWER TRANSMISSION
Original Filed March 1, 1934    8 Sheets-Sheet 1
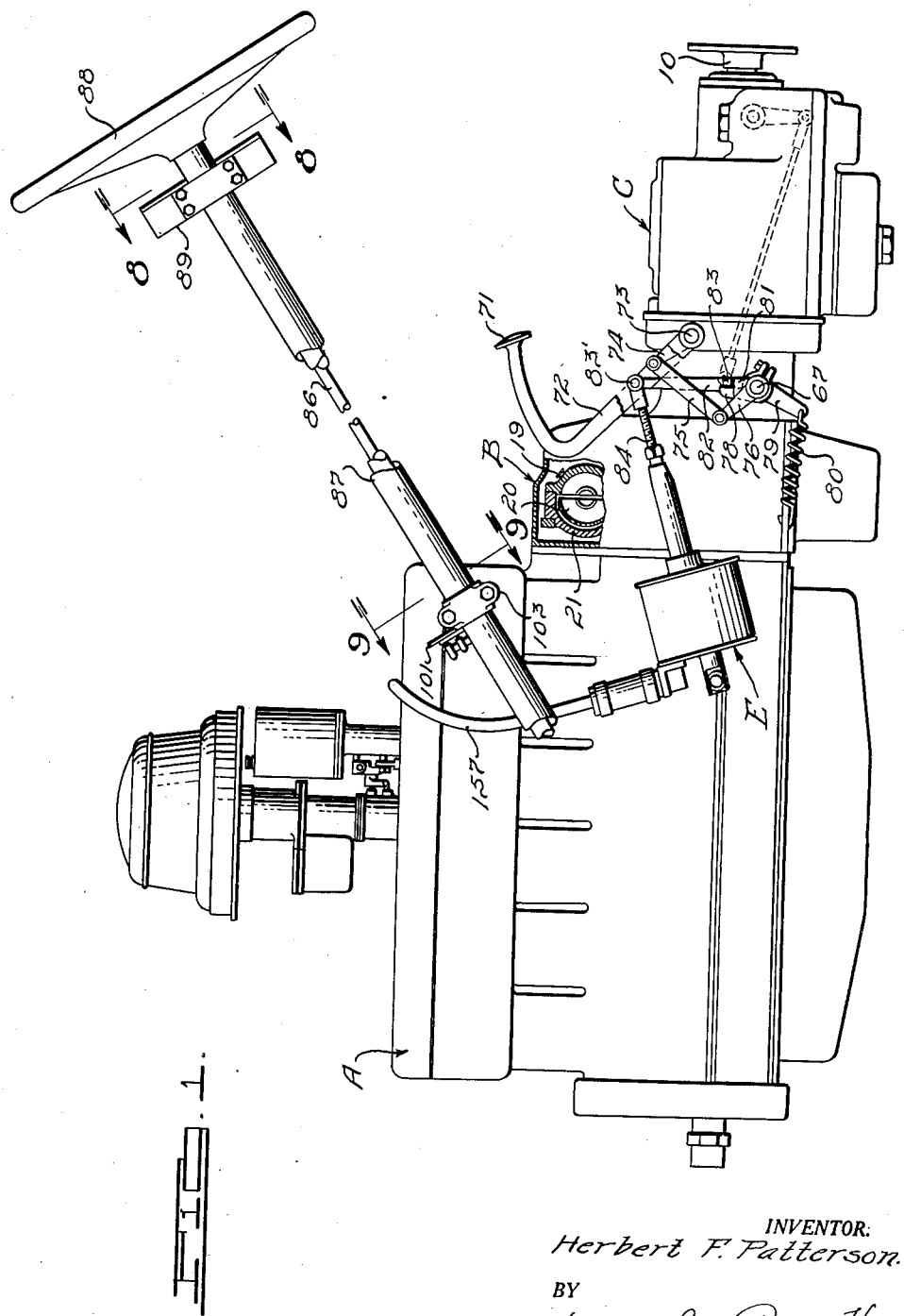
INVENTOR:
Herbert F. Patterson.
BY
Harness, Lind, Patee & Harris
ATTORNEYS.

July 5, 1938.  H. F. PATTERSON  2,122,488
POWER TRANSMISSION
Original Filed March 1, 1934   8 Sheets-Sheet 2
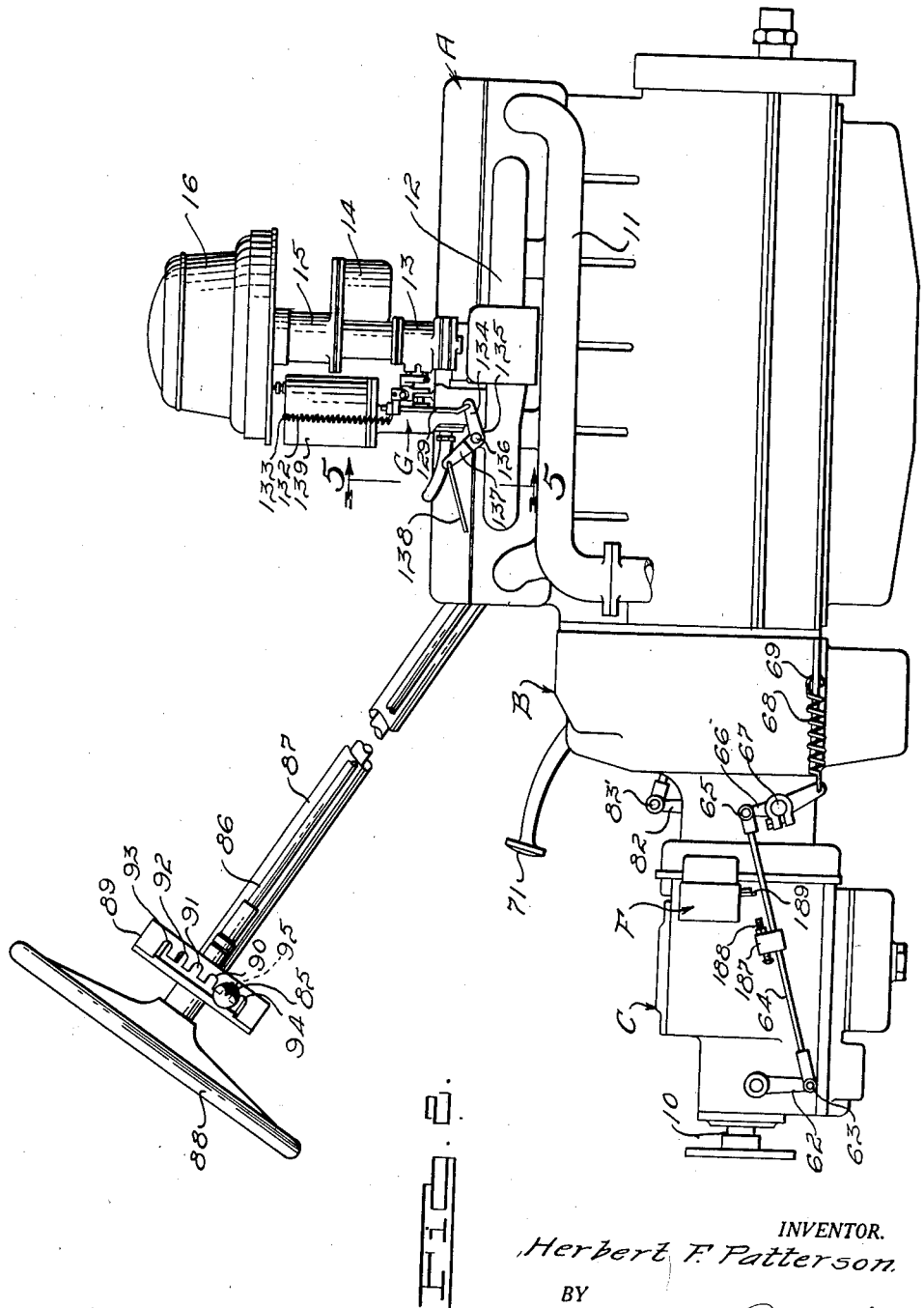
INVENTOR.
Herbert F. Patterson
BY
Harness, Lind, Patee & Harris
ATTORNEYS.

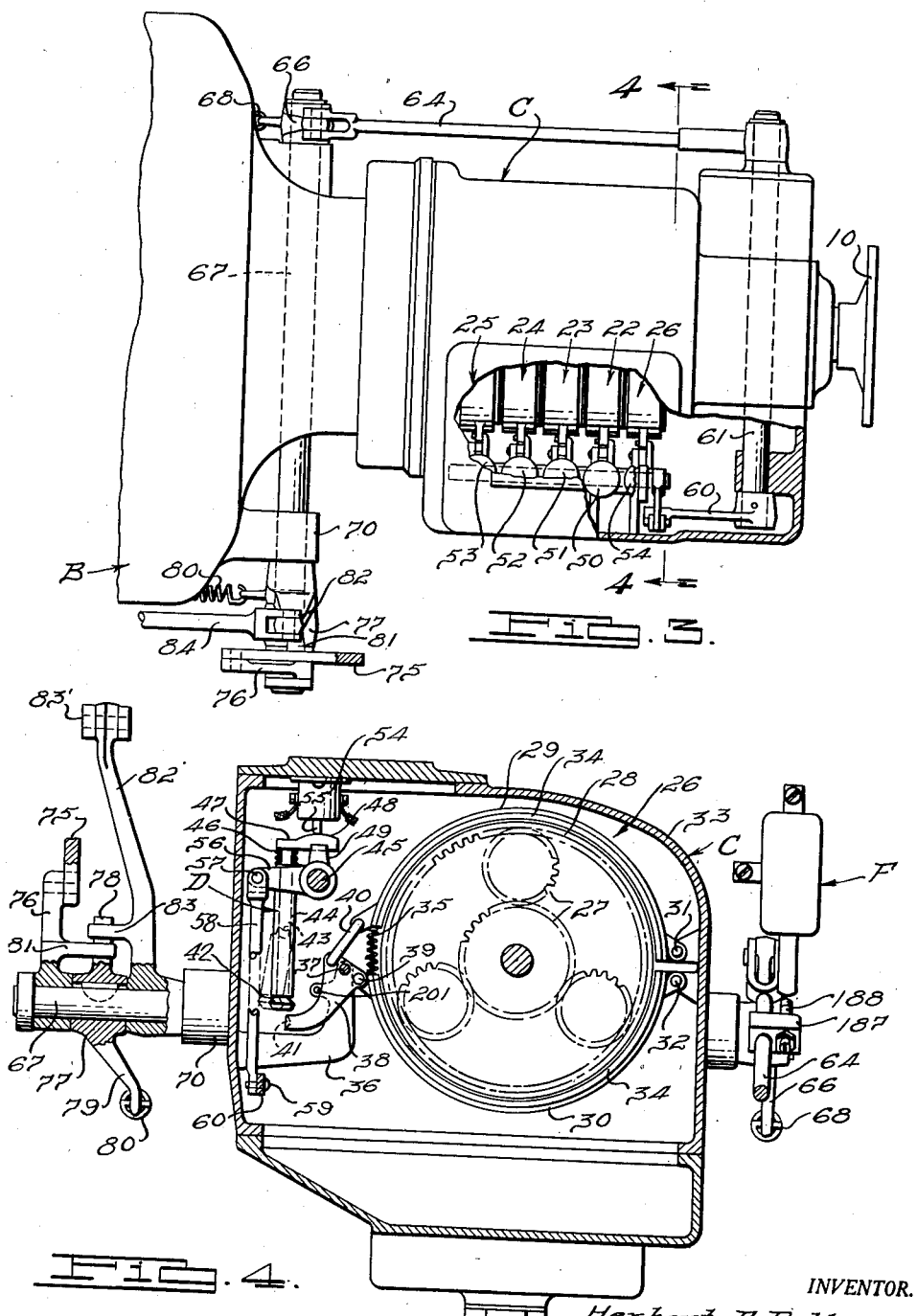

July 5, 1938.  H. F. PATTERSON  2,122,488
POWER TRANSMISSION
Original Filed March 1, 1934    8 Sheets-Sheet 4

INVENTOR.
Herbert F. Patterson.
BY
Harness, Dind, Patee & Harris
ATTORNEYS.

July 5, 1938.   H. F. PATTERSON   2,122,488
POWER TRANSMISSION
Original Filed March 1, 1934   8 Sheets-Sheet 5

INVENTOR.
Herbert F. Patterson.
BY
Harness, Lind, Patee & Harris
ATTORNEYS.

July 5, 1938.  H. F. PATTERSON  2,122,488
POWER TRANSMISSION
Original Filed March 1, 1934   8 Sheets-Sheet 6
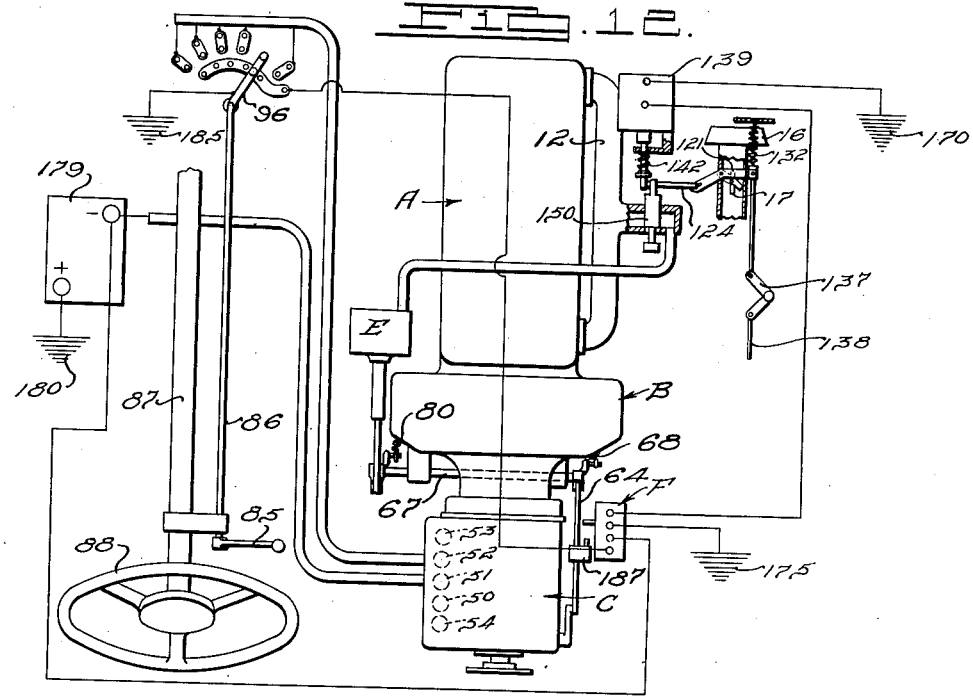
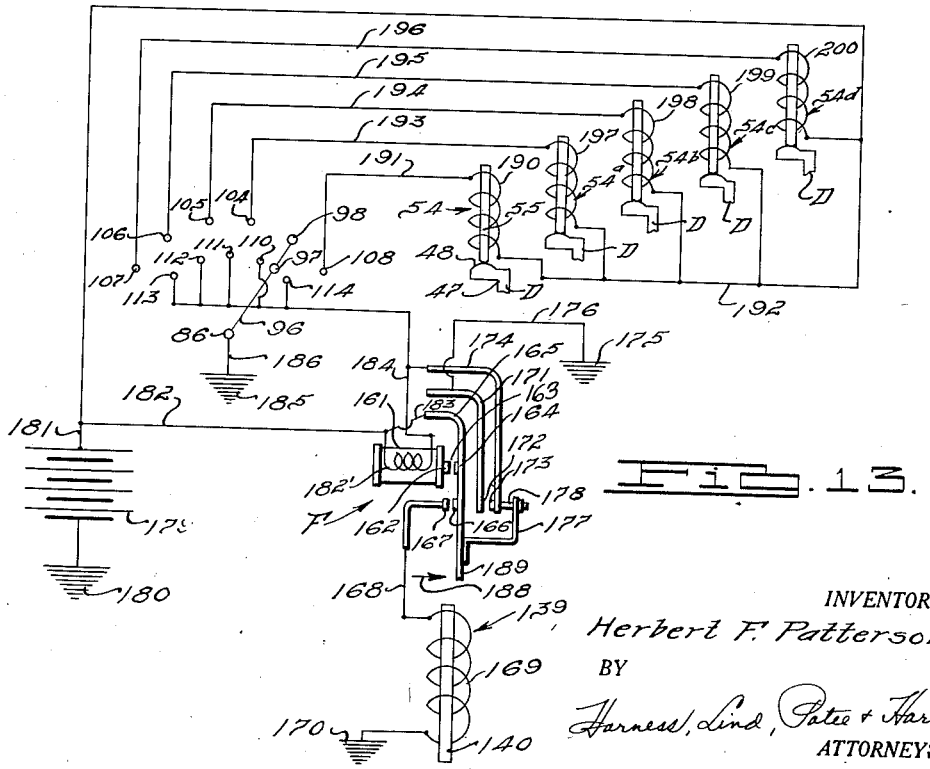
INVENTOR.
Herbert F. Patterson.
BY
Harness, Lind, Patee & Harris
ATTORNEYS.

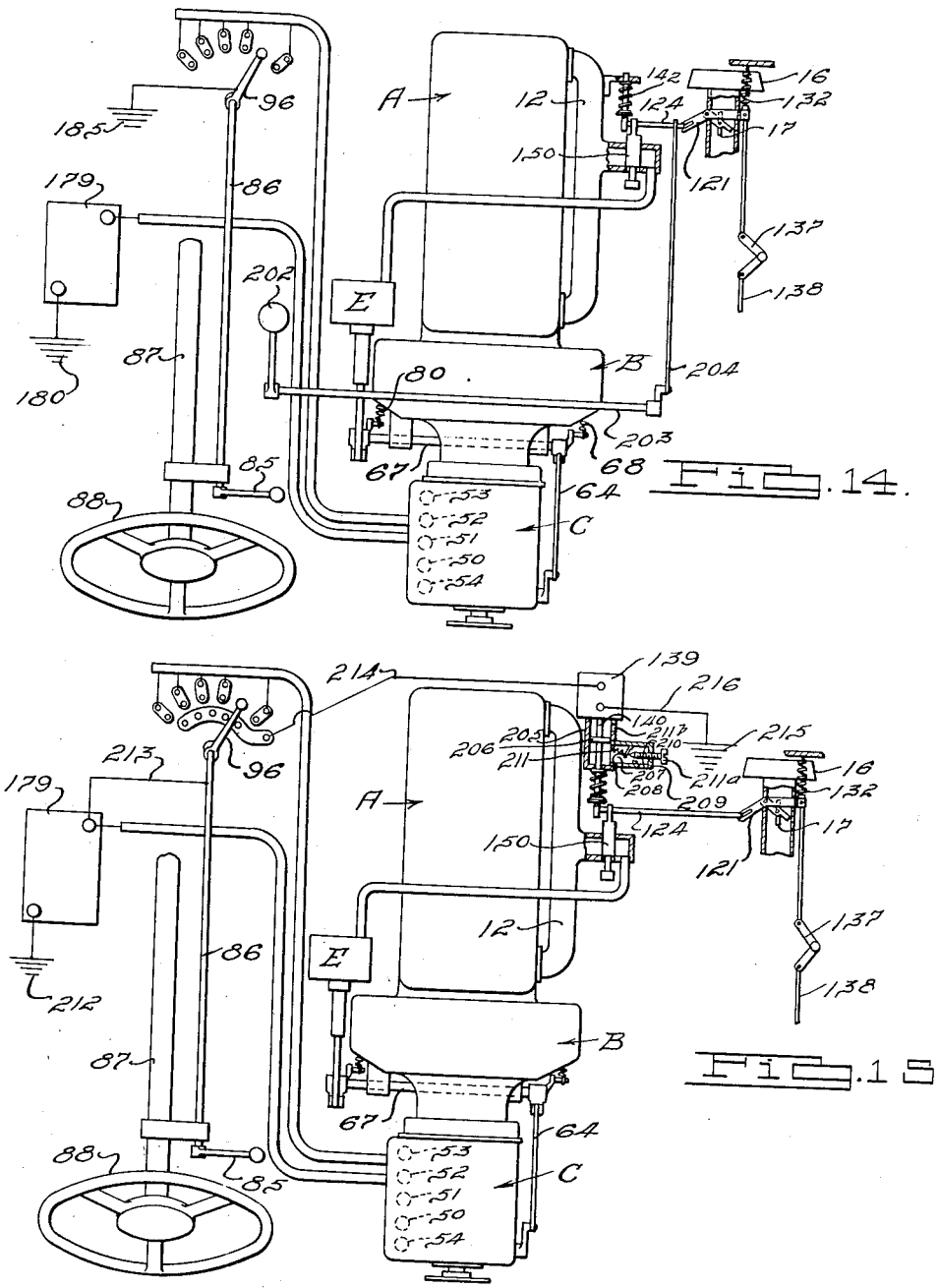

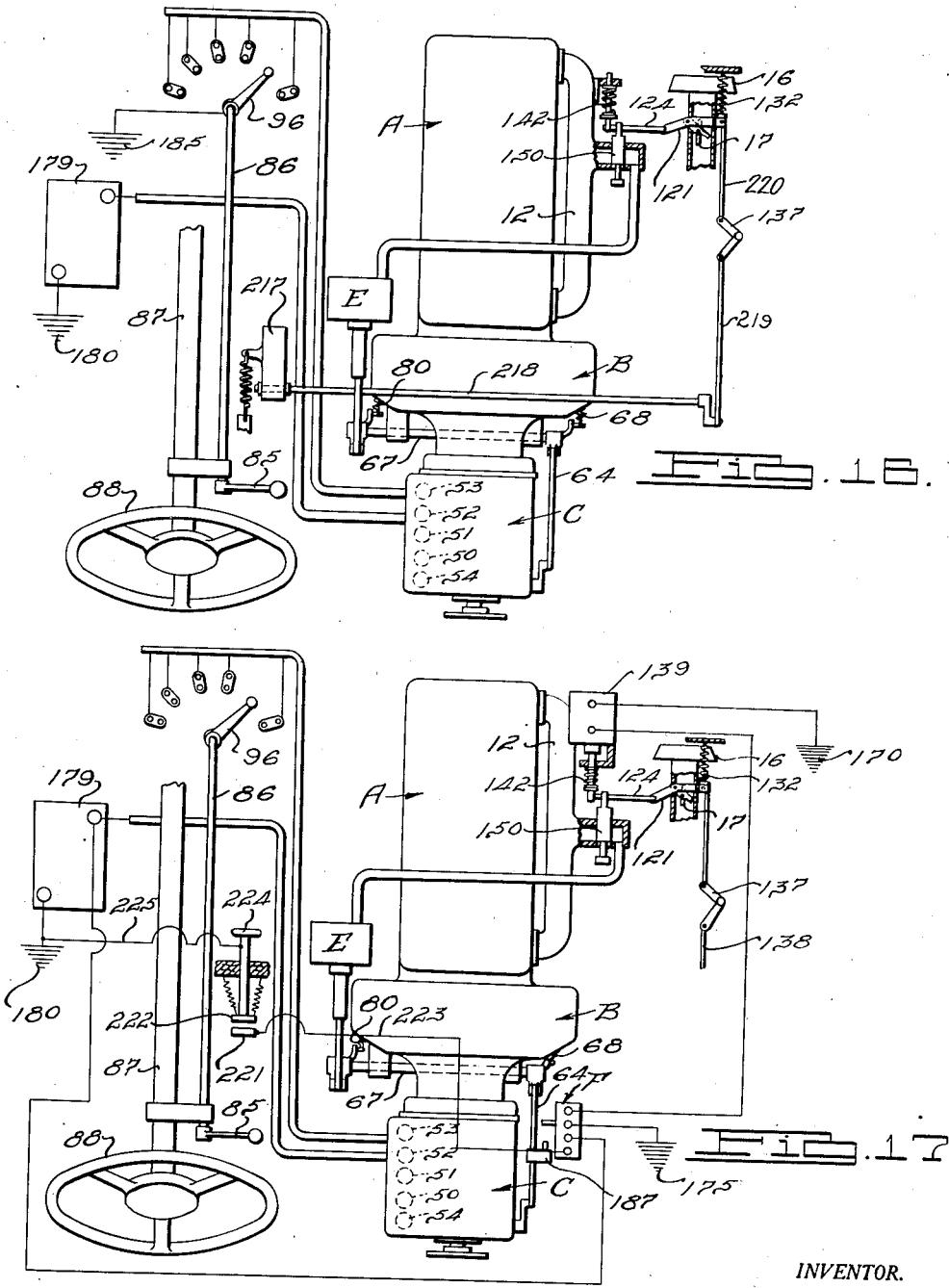

Patented July 5, 1938

2,122,488

UNITED STATES PATENT OFFICE 2,122,488

POWER TRANSMISSION

Herbert F. Patterson, St. Clair Shores, Mich., assignor to Chrysler Corporation, Detroit, Mich., a corporation of Delaware Application March 1, 1934, Serial No. 713,442
Renewed April 23, 1938

51 Claims. (Cl. 74—262)

This invention relates to power transmission devices and improvements in power transmission devices especially adapted for use in connection with motor vehicles, although not necessarily limited thereto.

It is desirable in connection with the drive for motor vehicles to provide a speed ratio changing transmission for varying the driving ratio between the engine and vehicle driving wheels and my invention is particularly related to motor vehicles having speed ratio changing transmissions. In its more limited aspects, my invention is further particularly related to improvements in motor vehicles having speed ratio changing transmissions of the planetary or epicyclic gear type.

A planetary type of transmission presents a number of advantages over the more conventional sliding gear types of transmissions and my invention is therefore primarily directed toward planetary types of transmissions and power transmission systems employing planetary gearing speed ratio controlling devices although the fundamental principles of my invention may, if desired, be employed in connection with transmissions of other types including the aforesaid sliding gear types of transmissions. By way of example and in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

The planetary type of transmission has the further advantage of not requiring a free wheeling clutch in order to obtain smooth and otherwise satisfactory gear shifting characteristics, and synchronizing devices customarily used on more conventional types of transmissions may also be dispensed with. The planetary type of transmission provides gear sets which are quiet at all speeds and which operate at higher efficiency than the more conventional countershaft types of sliding gear transmissions.

It is an object of my invention to provide improvements in motor vehicle transmissions and controls therefor; to provide improved means for operating the brake bands controlling the various gear trains of a planetary type of transmission; and to provide relatively simple means for controlling or actuating a planetary transmission, capable of manufacture at relatively low cost.

A further object of my invention is to provide improved transmission controlling means especially adapted for use with planetary transmissions, my transmission controls operating to establish the various gear ratios with improved positiveness, simplicity, and efficiency.

A further object of my invention resides in the provision of improved means for operating and controlling the various gear trains or speed ratios particularly for a planetary transmission whereby the gear changes may be automatically effected in response to manual controlling means manipulated by the vehicle driver or operator. Thus, I have provided improvements in planetary transmission controls wherein operation of a manual selector device automatically produces the desired speed ratio changes in the transmission.

A further object of my invention resides in the provision of improved means for effecting the changes in the transmission speed ratios through the application of power means under control of the vehicle driver. According to one feature of my invention, I preferably provide fluid pressure operated means for applying power to manipulate the transmission and while the fluid pressure may be in the form of oil or air under pressure I preferably utilize the partial vacuum created by the engine intake to provide the desired power. This vacuum power means is preferably arranged so as to release the various braking devices associated with the planetary gear sets, other power means such as one or more springs, for example, being provided to provide the necessary power to apply the braking means.

A still further object of my invention resides in the provision of vacuum operating means for a planetary transmission wherein the engine throttle is automatically closed to provide the desired degree of vacuum in response to manual operation of the speed ratio selector control, the arrangement preferably being such that the engine throttle is closed or partially closed independently of the position of the usual accelerator pedal or other throttle valve operating means which is normally manipulated to regulate the power produced by the engine.

Another object of my invention resides in the provision of means for quickly and automatically effecting changes in the gear ratios of a planetary transmission in response to manual manipulation of a selector control wherein the engine throttle valve is moved toward its closed position long enough to supply vacuum to a vacuum operating cylinder for releasing any braking means previously being operated in the planetary transmission, means being also provided and actuated in response to the aforesaid manipulation of a selector device for effecting a setting of the desired controls for the braking means so that on release of the vacuum, power means such as a spring aforesaid is automatically actuated to apply the desired speed ratio controlling brake. Thus, according to one embodiment of my invention, I have provided a completely automatic cycle for effecting changes in the speed ratios of a transmission and where the engine vacuum is utilized as a power means, I have provided a novel control of the vacuum supply to such power means.

A still further object of my invention resides in the provision of improved means for effecting the selection of the desired speed ratio controlling braking means, this selector means being in the nature of one or more solenoids adapted to be energized by the manually controlled selector device. While I have illustrated my improved solenoid actuated selector means in combination with my vacuum operated control system as aforesaid, I desire to point out that, if desired, this solenoid actuating means may be employed with other systems of power application for the various speed ratio controlling braking means and for the release thereof.

In a modified embodiment of my invention, I have provided means for adapting my transmission controlling mechanism for manual preselection of the various speed ratio gear changes. Thus, I have provided for preselection of the gear change not being produced until a further manual control device is operated by the vehicle driver. This additional device may be arranged so that manipulation thereof will close the engine throttle and open the intake vacuum to the aforesaid vacuum operating cylinder instead of having the vacuum supply and throttle control automatically responsive to manipulation of the manually operated selector device.

In another embodiment of my invention, I have provided an electrically operated means such as a solenoid which is energized on operating the manually controlled device to close the engine throttle and open the vacuum operating cylinder to the engine intake system.

In a further embodiment of my invention, I have provided means for establishing a vacuum in the aforesaid vacuum operating cylinder in response to release of the usual accelerator pedal which normally controls the engine throttle valve. In this embodiment of my invention a preselection of the various gear speed ratios is effected, the gear changes not occurring until the operator releases the accelerator pedal to establish a vacuum in the vacuum operating cylinder.

In a still further embodiment of my invention, I have provided a preselector speed ratio controlling system wherein the gear changes are not directly produced by manipulation of the selector device but are automatically responsive to an additional manually operated device although in this instance this additional manually operated device produces an automatic completion of the gear change cycle and does not have to be held in its operated position to effect the cycle.

Further objects and advantages of my invention will be apparent from the following detailed description of several illustrative embodiments of the principles of my invention, reference being had to the accompanying drawings in which:

Fig. 1 is a side elevational view of the engine and transmission assembly and further showing the vacuum operating cylinder.

Fig. 2 is a like view of the other side of the engine and transmission assembly.

Fig. 3 is a top plan view of the transmission, a part of the casing thereof being broken away to illustrate the speed ratio controlling braking devices.

Fig. 4 is a sectional elevational view through the transmission of Fig. 3, the section being taken along the line 4—4 of Fig. 3 and illustrating one of the gear ratio controlling devices and actuating means associated therewith.

Fig. 12 is a diagrammatic plan view illustrating the transmission controlling system as a whole.

Fig. 13 is a wiring diagram of the electrical circuits employed in my transmission controlling system.

Fig. 14 is a diagrammatic plan view corresponding to Fig. 12 but illustrating a modified embodiment of my invention in which a separate manually operated device is provided for effecting the gear change cycle in response to preselection of the manually operated selector device.

Fig. 15 is a view corresponding to Fig. 12 but illustrating a further modification of my invention wherein the gear changing cycle is automatically responsive to manipulation of the manually operated selector device but wherein the electrical relay of Fig. 12 is dispensed with.

Figure 16 is a view corresponding to Fig. 12 but illustrating a still further modification of my invention wherein preselection of the various gear changes is possible, the gear changes being controlled by release of the accelerator pedal.

Fig. 17 is a further view corresponding to Fig. 12 and illustrating another modification of my invention wherein preselection for the various speed ratios is provided, the gear changes being automatically effected in response to manipulation of a further manual controlling device which includes the electrical relay of Fig. 12.

Figures 5, 6:
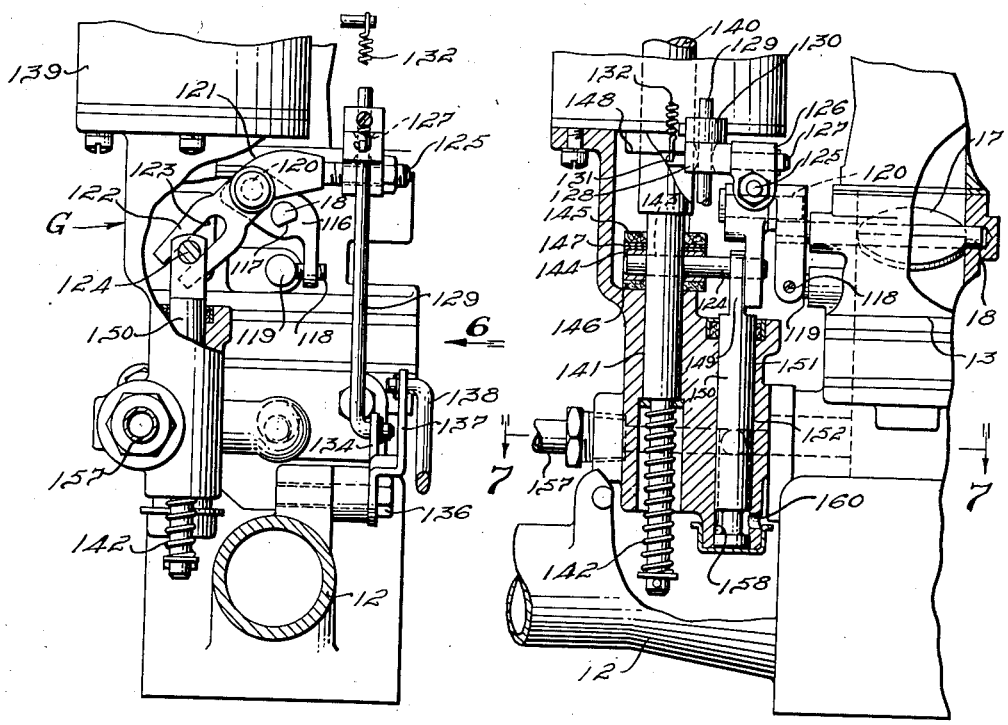
Fig. 5 is a detail sectional elevational view taken along the line 5—5 of Fig. 2, certain of the parts being broken away to illustrate the throttle valve and vacuum valve controlling mechanism.
Fig. 6 is a side elevational view of the mechanism shown in Fig. 5, the view being taken as indicated by the arrow 6 shown in Fig. 5, certain of the parts being broken away to further illustrate the mechanism.

Referring now to the drawings and with particular reference to the embodiment of my invention illustrated in Figs. 1 to 13 inclusive, I have illustrated the vehicle driving engine or prime mover A transmitting its drive through a main clutch B to the transmission C, the drive passing from the transmission through a power take-off shaft 10 which, as usual, may extend rearwardly of the vehicle to drive the usual rear ground wheels (not shown).

The engine A may be of the usual type having an exhaust manifold 11 illustrated in Fig. 2, and the intake manifold 12 supplied in the usual manner with fuel mixture. Thus, the intake manifold 12 communicates by a down draft riser 13 with the usual carburetor 14 and air intake pipe 15, the latter having the usual air cleaner 16. Within the riser 13 is located the usual butterfly type throttle valve 17 carried by a pivotal shaft 18 as best shown in Fig. 6. The actuating mechanism for the throttle valve 17 will be referred to in detail hereinafter.

The clutch B may be of any suitable construction for controlling the drive between engine A and transmission C, the clutch B being illustrated in Fig. 1 in the form of a fluid type having the usual driving and driven cooperating vane members 19 and 20 respectively. The driving vane member 19 is carried by the engine flywheel 21 and the driven vane member 20 is secured to the usual power shaft which extends rearwardly to transmission C, this power shaft not being shown. I have illustrated a fluid type of clutch since a clutch of this character has a number of advantages in connection with a transmission of the planetary gear type. Thus, the fluid type of clutch is desirable in providing a smooth drive for the vehicle through the planetary transmission, relatively high power driving efficiency, and other well-known, favorable characteristics.

Referring now particularly to Figs. 3 and 4, I have illustrated the transmission C as the planetary gear type having a plurality of clutch or brake controlling devices associated with and controlling the various planetary gear trains for the driving ratios of the transmission. Thus, the braking devices 22, 23, 24, 25 and 26 are respectively adapted, when actuated, to establish the first, second, third, fourth, and reverse speed driving ratios between the engine A and the power take-off shaft 10.

In Fig. 4 I have illustrated one of the speed ratio brake controlling means 26 and I have illustrated at 27 in somewhat diagrammatic manner a typical planetary gear set associated with the braking means 26. If desired, the planetary gear sets and brake controlling means associated therewith may be arranged to provide additional or lesser speed ratios than those illustrated since various arrangements of planetary gear transmissions are well known in the art. The braking means 26 which is typical of the several braking means aforesaid is adapted when actuated to arrest rotation of a drum or other rotary element 28, it being understood that the drum 28 is rotated by the planetary gear train 27 associated therewith when the braking means 26 is not in operated condition. When the braking means 26 is operated by the mechanism referred to hereinafter, the drum 28 is brought to a stop and the planetary gearing 27 is then caused in the well-known manner to transmit the drive from engine A to the power take-off shaft 10, this power take-off shaft being operated in the direction and at the speed ratio determined by the operation of the respective brake controlling means aforesaid.

Associated with each of the rotary controlling drums of the planetary gear sets is a suitable braking means adapted to frictionally engage the respective drums for arresting rotation thereof. Thus, in Fig. 4 the drum 28 has associated therewith the brake shoes 29 and 30 respectively pivotally supported at 31 and 32 to the casing 33 of the transmission. The shoes are provided with suitable brake lining material 34 and the shoes are yieldingly held from contact with drum 28 by a spring 35 which may act between the ends of the shoes diametrically opposite the pivotal supports 31 and 32 aforesaid.

Fixed to the transmission casing 33 are a plurality of suitably spaced brackets 36 carrying a rod 37 which extends longitudinally of the transmission. Opposite each of the brake controlling devices is a brake shoe operating lever 38 pivotally supported on rod 37, each lever 38 having a pivotal connection 39 with the end of shoe 30. The end of the cooperating shoe 29 is pivotally connected by a link 40 with lever 38 on the opposite sides of rod 37 from the location of the pivotal connection 39. This lever 38 extends laterally outwardly and terminates in a socket 41 shaped to receive the bevelled end 42 of selector rod 43 which is a part of the typical selector element D.

Each of the selector elements D consists of a casing or carrier 44 adapted to slidably receive the rod 43, the carrier 44 being fixed to a bus bar 45 which extends longitudinally of the transmission opposite the various brake controlling devices. The rod 43 is yieldingly urged upwardly in carrier 44 by a spring 46 so as to space the head 47 of rod 43 above the carrier 44. The head 47 is provided with an arcuate face 48 concentric with the axis of bus bar 45 and rod 43 is prevented from turning on its axis by a pair of ears 49 which slidably receive the head 47.

In Fig. 3 I have illustrated a plurality of longitudinally spaced selector actuating solenoids 50, 51, 52, 53 and 54 respectively associated with the brake controlling devices 22, 23, 24, 25 and 26, Fig. 4 illustrating the solenoid 54 in association with one of the selector elements D which is associated with the brake controlling means 26. The solenoid 54 which is typical of the aforesaid solenoids is provided with an actuating armature 55 which contacts with the aforesaid arcuate face 48 of head 47. The means for electrically energizing the solenoids will be referred to in detail hereinafter.

At the rear end of bus bar 45 I have provided a lever 56 which is fixed to the bus bar at one end of the lever, the outwardly extending end of the lever being pivotally connected at 57 to a link 58 which extends downwardly for pivotal connection at 59 with a lever 60 connected to a rock shaft 61 which extends transversely through the transmission as illustrated in Fig. 3.

The cross shaft 61 projects laterally from transmission C where this shaft is provided with a downwardly extending lever 62 best shown in Fig. 2, the lever being pivotally connected at 63 with a rod 64. The forwardly extending end of the rod is pivotally connected at 65 to a lever 66 pivotally supported intermediate its ends by a shaft 67. The lever 66 is secured to shaft 67 and this lever has a downwardly extending arm yieldingly urged forwardly as viewed in Fig. 2 by a relatively heavy spring 68 the forward end of which is anchored at 69 to the housing of clutch B. As viewed in Fig. 3 the shaft 67 extends transversely of the transmission C and forwardly thereof to the other side of the transmission and beyond a bearing support 70 for the shaft.

In order to rock the shaft 67 against the action of spring 68 so as to swing the selector elements D to the dotted line position shown in Fig. 4, I have provided a power operating means and also a manually operating means actuable independently of the power means. This manually operating means is useful in the event of failure of the normally operating system, or if desired suitable means may be provided to render the normal system inoperative at the will of the driver. Furthermore, this manually operable means may be actuated when the engine is not running to produce a vacuum or at other times when the vacuum supply might fail for some reason. As shown in Figs. 1 and 4 the manual operating means consists of a foot pedal 71 conveniently located for operation by the vehicle driver, this foot pedal being carried by a lever 72 pivotally supported by a shaft 73 which, in turn, is provided with a lever 74 connected through a link 75 to a lever 76, the latter lever being freely supported on the aforesaid shaft 67. The shaft 67 has a collar 77 fixed thereto, this collar having an upstanding projection 78 and a downwardly extending arm 79 engaged by a second relatively heavy spring 80 which is adapted to supplement the action of the aforesaid spring 68. The lever 76 has a lateral projection 81 adapted to engage the projection 78 when the pedal 71 is depressed whereby the shaft 67 may be given a rotary movement against the action of the springs 68 and 80.

The shaft 67 also carries a lever 82 which is freely rotatable with respect to shaft 67, this lever also having a lateral projection 83 adapted to engage the projection 78 for imparting a rotary movement to shaft 67 against the action of the aforesaid springs, it being apparent that the levers 76 and 82 are adapted to independently operate the shaft 67 by reason of the projection 78.

The lever 82 extends upwardly from shaft 67 for pivotal connection at 83' with the rearwardly extending end of a power operated rod 84 which, according to the illustrated embodiment of my invention, is adapted for power movement by a vacuum device or cylinder E shown in Fig. 1. The details of the construction of the vacuum device E are not illustrated since such parts are well understood and form no part in themselves of my invention. The vacuum device E includes the usual diaphragm or piston operating within the vacuum cylinder and connected to move the piston rod 84 when subjected to the influence of a vacuum as will be presently apparent. During this power movement the piston rod 84 is actuated forwardly as viewed in Fig. 1 so as to move the shaft 67 against the action of the aforesaid springs 68 and 80.

I will next describe the details of the manually controlled selector device for effecting actuation of the various brake controlling devices 22, 23, 24, 25 and 26. In Figs. 1 and 2 I have illustrated this mechanism as consisting of a manually operated selector arm 85, this arm or lever being connected to a shaft 86 which may conveniently extend along the usual steering post 87 having the well-known vehicle steering wheel 88 so that the selector arm or lever 85 is positioned within ready and convenient reach of the vehicle operator for manipulating the transmission C.

Associated with the selector arm 85 is a selector segment 89 having a plurality of notches 90, 91, 92, 93 and 94 respectively corresponding to the positions of selector arm 85 for effecting actuation of the brake controlling devices 22, 23, 24, 25 and 26. When the selector arm 85 is positioned to engage the neutral notch 95, none of the brake controlling devices is actuated and the transmission C is in neutral so that the power from engine A is not being transmitted to the power take-off shaft 10 and the motor vehicle is released from the driving influence of engine A.

The rod 86 is adapted to oscillate in accordance with the movement imparted thereto by reason of adjustment of the selector arm 85 into the aforesaid notches of the selector segment 89 and this oscillatory adjustment of rod 86 is likewise transmitted to a selector contact arm 96 fixed to the rod 86 near the lower end thereof. The contact arm 96 carries a pair of radially spaced contact points or pieces 97 and 98 respectively urged by springs 99 and 100 into contact with a selector contact segment 101 best shown in Figs. 9 and 10. This segment 101 is rigidly carried by an arm 102 and the clamping means 103 to the aforesaid steering post 87. The selector contact segment 101 is provided with a series of electrical contacts adapted to establish an electrical circuit by reason of the contact point 98 when the arm 96 is adjusted by the aforesaid selector arm 85. Thus the segment 101 is provided with the electrical contacts 104, 105, 106, 107 and 108 adapted to be respectively engaged by the contact piece 98 when the selector arm 85 is engaged with the aforesaid notches 90, 91, 92, 93 and 94. Thus, by way of example, when the selector arm 85 is positioned for engagement with notch 90, the selector contact arm 96 will be positioned so that the contact piece 98 will engage the electrical contact 104, the latter being the first speed electrical contact and, by way of further example, the electrical contact 108 may be termed the reverse contact. The contact segment 101 is formed of an insulating material and it will be noted that a space 109 is provided between the contacts 104 and 108, this space being the neutral space for receiving the contact point 98 when the selector arm 85 is positioned in the neutral notch 95.

The selector contact segment 101 has a second series of electrical contacts engageable with the aforesaid contact piece 97 carried by the selector contact arm 96, the contact points of this second series lying radially intermediate adjacent contact points of the first said series so as to be momentarily engaged by the contact piece 97 when the selector arm 85 is moved from one of the notches of selector segment 89 to an adjacent notch thereof. Thus, the contact segment 101 is provided with the electrical contact points 110, 111, 112, 113 and 114, a neutral space 115 being arranged intermediate the contact points 110 and 114 as indicated in Fig. 3.

Figure 11:
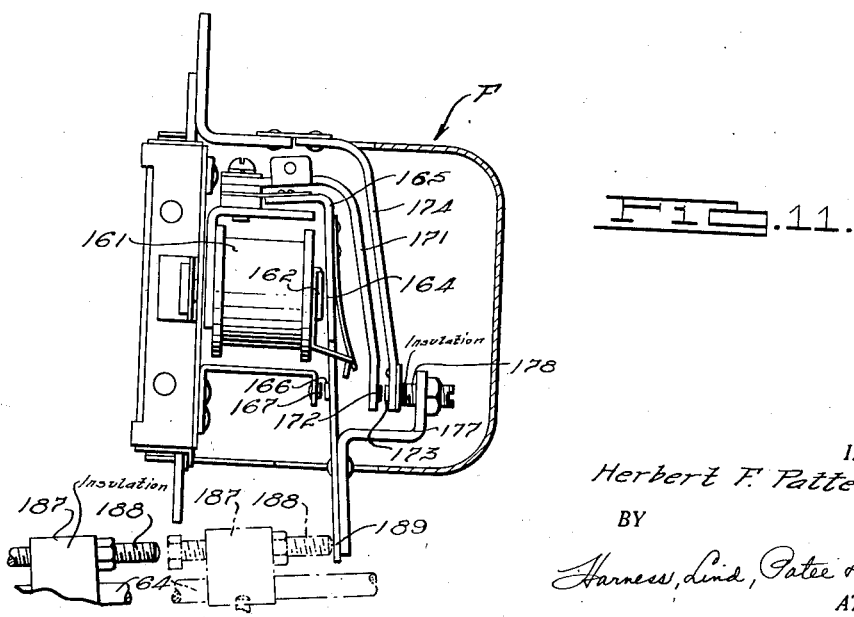
Fig. 11 is a detail sectional view of the electrical relay employed in my system.

The first said series of electrical contact points 104 to 108 inclusive are adapted to respectively energize the aforesaid selector actuating solenoids one of which has been indicated at 54 in Fig. 4 and the second said series of electrical contacts 110 to 114 inclusive are adapted to energize an electrical relay F best illustrated in Figs. 11 and 13. This relay, through a series of electrical circuits controlled by the aforesaid contact points of the second series, is adapted to actuate suitable controlling means for momentarily closing the engine throttle valve so as to establish a partial vacuum in the engine intake system, to open the vacuum thus produced to the vacuum cylinder E, to maintain operation of the vacuum cylinder until the selector elements D have been adjusted, and to then automatically restore the engine throttle valve to its control by the accelerator pedal, cut off the vacuum supply to the vacuum cylinder E, and to permit the springs 68 and 80 to actuate one of the selector elements D for establishing a predetermined desired speed ratio of transmission C.

Referring now particularly to Figs. 2, 5 and 6, I will describe the details of my controlling means for the engine throttle valve and vacuum controlling valve. This controlling means is generally designated at G and referring particularly to Figs. 5 and 6 it will be noted that the aforesaid shaft 18 which carries the throttle valve 17 projects laterally outwardly from the riser 13 to mount a throttle valve lever 116 fixed to shaft 18 by reason of the flat 117 formed on the outer end of the shaft. In order to limit the closing movement of throttle valve 17, the lever 116 has a downwardly extending end thereof provided with an adjustable stop 118 engageable with a fixed abutment 119, the stop being illustrated as engaging this abutment with the parts positioned as illustrated in Fig. 5. The lever 116 has an upwardly and laterally extending arm which is provided with a pivot pin 120 extending laterally beyond lever 116 to pivotally support a compensating lever intermediate the ends thereof, this compensating lever 121 having one of its ends 122 formed with a slot 123 adapted to receive one end of a pin 124. The other end of lever 121 is threaded at 125 to support a bracket 126, the latter having a bore extending at right angles above the axis of the threaded end 125 to rotatably receive a pin 127 which projects from a collar 128. The collar 128 slidably receives a rod 129 which extends generally vertically and secured to this rod is a cylindrical collar 130 which forms an abutment for moving the collar 128. The latter collar has a projection 131 to which is secured one end of a tension spring 132, this spring extending upwardly to a suitable point of anchorage designated at 133 in Fig. 2. The spring 132 yieldingly acts to rotate the lever 116 in the clockwise direction as viewed in Fig. 5 so as to close the throttle valve 17.

The lower end of the rod 129 is connected to the arm 134 of the lever 135 pivotally supported at 136, this lever having a second arm 137 actuated by a suitable linkage 138 which extends rearwardly as viewed in Fig. 2 for connection with the usual well known accelerator pedal or other manual operator for controlling the engine throttle valve 17. Thus, when the accelerator pedal is depressed to move the link 138 forwardly, this movement acts through lever 135 to move the rod 129 downwardly so as to cause the collar 130 to act on the collar 128 to swing the lever 116 in a counterclockwise direction as viewed in Fig. 5 and to thereby move the throttle valve 17 toward its open position.

An electrical solenoid 139 forms a part of the controlling mechanism G and is provided with a downwardly extending solenoid core 140, adapted when solenoid 139 is electrically energized, to move upwardly in a bearing guide 141, the lower end of the solenoid core 140 being acted on by a spring 142 which serves to yieldingly position the solenoid core downwardly to the position thereof illustrated in Figs. 5 and 6.

The solenoid core 140 is provided with a transversely extending opening 143 which receives the aforesaid pin 124 and this pin carries a cylindrical block 144 provided with upper and lower yielding bumpers or pads 145 and 146 respectively. These pads may be formed of leather or other suitable shock absorbing material, and interposed between the block 144 and one of these pads such as the pad 145, I have provided a series of shims 147 adapted to adjustably regulate the distance between the upper face of pad 145 and the axis of the pin 124. The pad 146 contacts with the upper face of the bearing guide 141 when the spring 142 acts to move the solenoid core 140 downwardly as illustrated in Fig. 6. The upper pad 145 is adapted to contact with an abutment 148 to arrest the upward movement of the solenoid core 140 when the solenoid 139 is energized to move the solenoid core against the spring 142.

Figure 7:
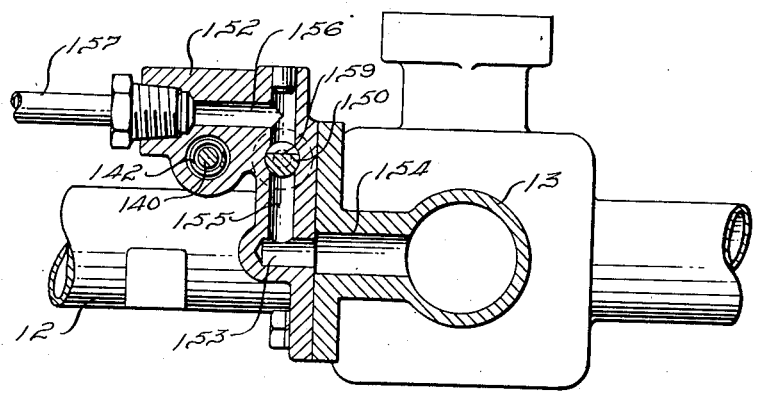
Fig. 7 is a sectional view taken along the line 7—7 of Fig. 6 and showing the vacuum valve control.
Figure 8:
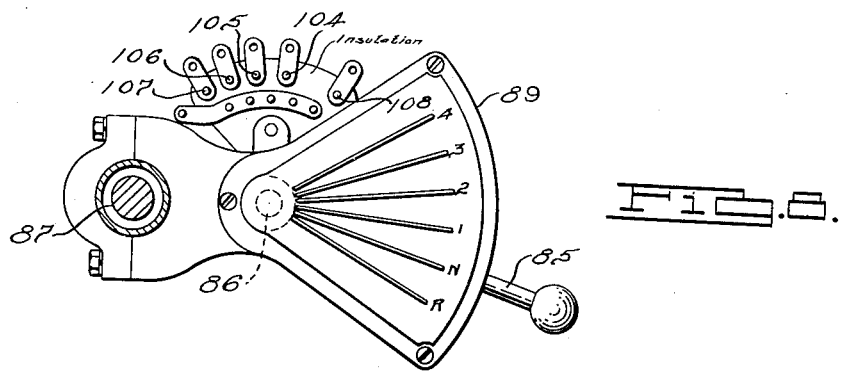
Fig. 8 is a detail view partly in section taken along the line 8—8 of Fig. 1 and illustrating the manually operated selector device.
Figures 9, 10:
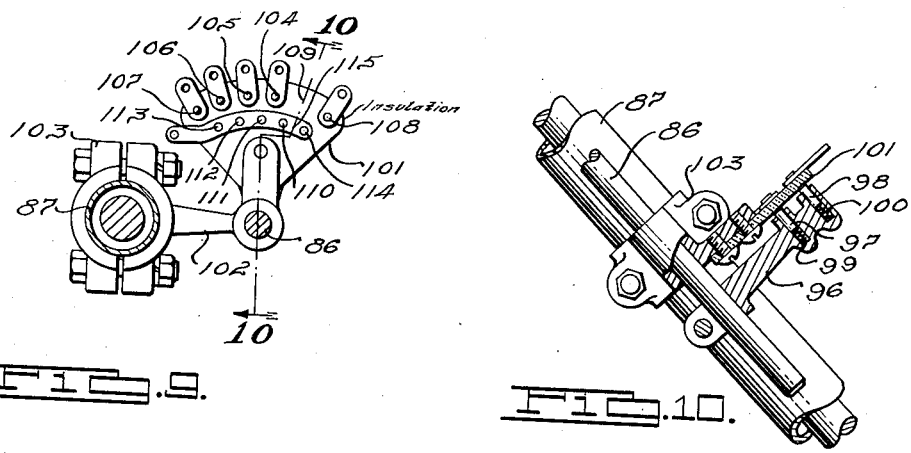
Fig. 9 is a detail view partly in section taken along the line 9—9 of Fig. 1 and illustrating the selector contact segment for establishing the various electrical circuits.
Fig. 10 is a sectional view along the line 10—10 of Fig. 9 showing the selector contact arm in association with the selector contact segment of Fig. 9.

Secured to the pin 124 is a stem 149 of a vacuum controlling valve 150, the latter being adapted to reciprocate in the bore 151 of the casting 152. The casting 152 as best shown in Fig. 7 is provided with a passage 153 adapted to communicate with a passage 154 opening inwardly to the riser 13. The passage 153 has a second portion 155 thereof and extending transversely thereto, the passage 155 communicating with a further passage 156 having an outlet by reason of the conduit 157. The conduit 157 leads to the vacuum cylinder E as best shown in Fig. 1 and is adapted to place the vacuum cylinder in communication with the riser 13 under control of the vacuum valve 150.

The valve 150 has an annular valving portion 158 thereof located adjacent the lower end of the valve member, it being apparent that when the solenoid core 140 is actuated upwardly, the pin 124 will raise the valve member 150 upwardly so as to register the valving annulus 158 with the aforesaid passages 155 and 156 and thereby open the conduit 157 to the vacuum in the riser 13. When the valve member 150 is lowered as shown in Figs. 5, 6 and 7 to close off communication between passages 155 and 156, it is desired to vent the conduit 157 to the atmosphere and to this end the valve member 150 is formed with a longitudinally extending groove 159 between the valving annulus 158 and the passage 156, the valving annulus 158 communicating with the atmosphere by reason of a vent or opening 160 shown in Fig. 6.

In the operation of the controlling mechanism G, let it be assumed that the solenoid 139 is not energized so that the solenoid core 140 is lowered by spring 142 to the position of these parts as illustrated in Figs. 5 and 6. In such position the motor vehicle operator is enabled to open the throttle valve 17 the desired amount by depressing the usual accelerator pedal to move the link 138 forwardly as viewed in Fig. 2, this movement acting through the lever 135 to pull the rod 129 downwardly against the action of spring 132. The motion of rod 129 is communicated through collars 130 and 128 so as to pull downwardly on the end 125 of the compensating lever 122, this compensating lever being swung downwardly around the shaft 18, the slotted end 123 sliding along the pin 124. The pivot pin 120 accommodates this movement of the compensating lever 121 so that it will be apparent that the lever 116 will be given a counterclockwise rotation as viewed in Fig. 5 so as to open the throttle valve 17.

Now let us assume that the throttle valve 17 has been opened under the influence of the accelerator pedal acting through the aforesaid link 138, and let it be further assumed that with the accelerator pedal held in such position, the solenoid 139 is energized in a manner which will be hereinafter explained. The energization of solenoid 139 will move the solenoid core 140 upwardly against the resistance of spring 142 and this movement will cause the pin 124 to raise the forked end 123 of the compensating lever 121 so as to swing the throttle valve lever 116 to its closed position, it being understood that reference herein to a closed position of throttle valve 17 means substantially the idling condition of the internal combustion engine, this being usually referred to as the closed throttle condition of the engine. During this closing movement of the throttle valve 17 under the influence of upward movement of solenoid core 140, the compensating lever 121 bodily swings on the pivot pin 120, and this pin in turn carries the lever 116 in a clockwise direction, the lever end 122 moving upwardly and the lever end 125 remaining at its lowered position under control of the link 138 and swinging on pin 127. Just as soon as the solenoid 139 is de-energized, the spring 142 will pull the solenoid core 140 downwardly and the throttle valve 17 will be restored to whatever position it occupied at the time that the solenoid 139 was energized as aforesaid, it being assumed that the vehicle operator has meantime held the accelerator pedal down to a constant position. If, after the solenoid 139 has been energized, the vehicle operator changes the position of the accelerator pedal prior to de-energization of the solenoid 139, when the solenoid is de-energized the throttle valve 17 will take the final position of the accelerator pedal. In other words, regardless of the position of the accelerator pedal and throttle valve 17, the valve 17 will be closed when solenoid 139 is energized and, on de-energization of the solenoid, the throttle valve 17 will then be immediately returned under control of the accelerator pedal. In the event that the solenoid 139 is energized with the throttle valve closed, then the lever end 122 moves upwardly around pivot pin 120 and the lever end 125 moves downwardly, the latter movement being possible by reason of collar 128 sliding downwardly freely on the rod 129.

When the solenoid 139 is de-energized as shown in Figs. 5 and 6, it will be noted that the valve 150 is in its lowermost position so as to close off communication between riser 13 and conduit 157 leading to the vacuum operating cylinder E. However, when solenoid 139 is energized, the resulting upward movement of solenoid core 140 will act through pin 124 to raise the valve 150 so as to establish communication between riser 13 and conduit 157 through the valve annulus 158, the throttle valve 17 being simultaneously closed as aforesaid whereby the resulting vacuum will be introduced to the vacuum cylinder E. When the throttle valve 17 is being operated by the accelerator pedal through links 138, the compensating lever 121 fulcrums about its sliding pivot provided by the pin 124 and slot 123, the valve 150 not being disturbed inasmuch as such movement merely swings the pin 120 about shaft 18 as a center when the throttle valve 17 is either opened or closed.

I will next describe the details of the circuit controlling electric relay F. In general, the purpose of this relay is to control the energization and de-energization of solenoid 139 so as to make the cycle of gear changes automatically responsive to a shifting movement of the manually operated selector arm 85.

The details of the relay F are best illustrated in Fig. 11 and also in the wiring diagram shown in Fig. 13 and by referring to these figures it will be noted that the raly comprises an electro-magnet 161 having a magnetic core or pole point 162. The pole point 162 of the electro-magnet is normally separated by the full width of a gap 163 from a companion magnetic point 164 carried by the springing conductor 165 and this conductor in turn is provided with a contact 166 normally separated by a gap from a cooperating contact 167, the latter being adapted to pass current through conductor wire 168 leading to the coil 169 which is a part of the aforesaid solenoid 139. Thus, the solenoid armature is diagrammatically indicated at 140 in Fig. 13 and the other end of the coil 169 is grounded at 170.

A second springing conductor member 171 carries at one end thereof a contact 172 normally spaced by a gap from a cooperating contact 173 carried by a third springing conductor 174. The second said conductor 171 is grounded at 175 through a conductor wire 176. The conductor 165 carries an arm 177 provided with an insulated adjustable stop 178 which acts against the free end of the third said springing conductor 174.

Referring to Fig. 13 it will be noted that the storage battery 179 has one of its poles grounded at 180, the other pole extending through conductor wires 181 and 182 to the usual coil 182' of the electro-magnet 161 and also to the springing conductor 165 by a wire 183. The other end of the coil 182' extends through wire 184 to the third said springing conductor 174, the latter wire also being arranged for electrical connection in parallel with the aforesaid second series of contact points 110 to 114 inclusive of the selector contact segment 101. It will be noted that the selector contact arm 96 forms a part of the circuit and is grounded at 185 by a wire 186.

Referring for the moment to Fig. 2 it will be noted that the rod 64 which connects levers 66 and 62 is provided with a block 187 carrying an insulated kick-off screw or member 188. The end 189 of the springing conductor 165 extends downwardly into the path of the kick-off 188.

Returning now to Fig. 13 it will be noted that I have also illustrated the aforesaid first series of contacts 104 to 108 inclusive adapted to be engaged by the contact piece 98 of the selector contact arm 96 as this arm is moved from the illustrated neutral position either to the left or to the right. The solenoid 54 which was illustrated in Fig. 4, is also diagrammatically shown in Fig. 13, the solenoid coil 190 being connected through a wire 191 to the reverse contact point 108, the other end of the coil 190 extending through a wire 192 through the aforesaid wire 181 to the storage battery 179. In Fig. 13 I have also illustrated the head 47 of one of the selectors D which is associated with the reverse brake controlling device 26 as shown previously in Fig. 4. In similar manner the contact points 104, 105, 106 and 107 are respectively connected through conducting wires 193, 194, 195 and 196 through the respective solenoid coils 197, 198, 199 and 200 to the aforesaid wire 192. Associated with the aforesaid solenoid coils 197, 198, 199 and 200 are solenoid armatures corresponding to that designated at 55 and also selector elements D similar to the element D shown in detail in Fig. 4.

In operation of the transmission controlling system, let it be presumed that the motor vehicle is not being driven by engine A and that the manually operated selector arm 85 is in its neutral position engaging the neutral notch 95 of selector segment 89, this being the position of the parts as illustrated in Figs. 2, 8, 12 and 13. When the selector arm 85 is in its neutral position, it will be apparent that the selector contact arm 96 will be positioned as shown in Figs. 12 and 13 so that the contact pieces 97 and 98 thereof are not in electrical contact with the contact points of the respective series carried by the selector contact segment 101.

Furthermore, when the selector arm 85 is in the aforesaid assumed neutral position, the various selector elements D associated with the solenoids 54, 54a, 54b, 54c and 54d will be de-energized so that the selector elements D will all be positioned according to the solid line disclosure of the element D as shown in Fig. 4. In Fig. 4 the dotted line showing of selector element D is illustrated as having been rotated clockwise by the bus bar 45 under the influence of operation of the vacuum cylinder E against the action of springs 68 and 80. Also, in Fig. 4, the solenoid 54 is shown in the de-energized condition so that the rod 43 of the selector element is raised by spring 46 so as to position the actuating rod end 42 above and free from engagement with the notched end 41 of lever 38. When the selector arm 85 is in the neutral position, the springs 68 and 80 are free to act through the linkage so as to rock the bus bar 45 in a counterclockwise direction thereby swinging the selector element D from the dotted line position illustrated in Fig. 4 to the solid line position therein, the actuating rod end 42 lying above but free from contact with the lever 38. In similar manner it will be understood that the remaining selector elements D are similarly positioned inasmuch as they are all carried by the common bus bar 45 and likewise the actuating rod end 42 of each of the selectors D will lie free from contact with the respectively associated levers 38.

When the manually controlled selector arm 85 is in the aforesaid neutral position, the engine throttle valve 17 is normally closed to its idling position but in any event the relay F is not energized and likewise the solenoid 139 is not energized and therefore the solenoid core 140 is in its lowermost position of Fig. 6 so as to hold the vacuum controlling valve 150 in the closed or lowered position. Thus, the supply of vacuum is cut off to the vacuum operating cylinder E and this permits the springs 68 and 80 to act as aforesaid to rock the bus bar 45 in the counterclockwise direction as viewed in Fig. 4 so that in the neutral position of the selector arm 85, all of the selector elements D overlie their respective brake operating levers 38 and free from contact therewith.

Now, let it be assumed by way of example, that the motor vehicle driver desires to accelerate the motor vehicle and, while this can be brought about by shifting the selector arm 85 directly from the aforesaid neutral position to any of the notches 90, 91, 92, 93 or 94, let it be presumed that it is desired to accelerate the motor vehicle in the first or low gear of the transmission C by actuating the first speed brake controlling device 22. In order to effect such drive, the operator will move the selector arm 85 from the aforesaid neutral notch 95 into the first speed notch 90 shown in Fig. 2, this movement of the selector arm 85 producing a counterclockwise movement of the selector contact arm 96 as viewed in Figs. 12 and 13. In moving the selector arm 85 into engagement with the first speed notch 90, the selector contact arm 96 is thus moved to bring the contact piece 98 thereof into the first speed position so that this contact piece engages the first speed contact point 104, but prior to this action, it will be apparent that the contact piece 97 of the contact arm 96 will momentarily sweep across the contact point 110 so as to momentarily register this contact point with the contact piece 97 of the arm 96. I will first describe what takes place when contact piece 97 is engaged with contact point 110 as the contact arm 96 moves from the position illustrated in Figs. 12 and 13 to a position of registration between contact piece 98 and contact point 104.

Thus, when the contact piece 97 wipes across the contact point 110, a circuit is established from the storage battery 179 through wire 182 to the electro-magnet 161, through wire 184, contact point 110 and contact piece 97, arm 96, wire 186, the ground connections 185 and 180 completing this circuit.

When electro-magnet 161 is thus energized, the gap 163 is reduced by the pull of armature 162 so as to move the magnetic point 164 toward the armature piece 162, the yielding conductor 165 establishing contact between the points 166, 167. Furthermore, this movement of the conductor 165 carries the bracket 177 and stop 178 so as to spring the conductor 174 to establish a contact between the points 172 and 173.

It will thus be apparent that a primary electrical circuit is thereby established to the solenoid 139 as follows: From ground 180, storage battery 179, wires 182 and 183, thence through conductor 165 and contacts 166 and 167, thence through wire 168 and coil 169 of solenoid 139, the circuit being completed by the ground 170.

It will furthermore be noted that a supplemental or secondary circuit is likewise established from the conductor 171 which is grounded at 175, through contact points 172, 173, wire 184 and solenoid coil 182', wires 182 and 181, through battery 179 to ground 180.

It will therefore be noted that when the selector contact arm 96 establishes the electrical circuits through contact point 110 and contact piece 97, movement of the contact arm 96 beyond the contact point 110 will break the circuit including the ground 185 but by reason of the circuit including ground 175 and conductor 171, the circuits through the contact points 172, 173, and 166, 167, will remain closed and will not be broken.

When solenoid 139 is energized on the initial establishment of the electrical circuit including the solenoid coil 169, the solenoid core 140 will move upwardly against the spring 142 so as to bring about a closing movement of the engine throttle valve 17 and simultaneously therewith to open the riser 13 to the vacuum operating cylinder E as previously referred to. When the vacuum is thus introduced to the vacuum cylinder E, the piston rod 84 will be moved under power forwardly as viewed in Fig. 1 so as to rock the bus bar 45 in a clockwise direction to swing the several selector elements D from the aforesaid solid line position overlying the levers 38 so that these selector elements will occupy positions as illustrated by the dotted lines in Fig. 4. During the operation of the vacuum cylinder E, the rod 64 as viewed in Fig. 2 will be moved forwardly so that the kick-off 188 will move forwardly toward the end 189 of the springing conductor 165.

When the selector arm 85 has been brought to the aforesaid assumed position of engagement with the first speed notch 90, the contact piece 98 of the contact arm 96 will engage the contact point 104 so as to complete the electrical circuit including storage battery 179 through the solenoid coil 197 of the solenoid 54a associated with the first speed brake controlling device 22. This will cause energization of the first speed solenoid 54a so as to cause the solenoid core 55 thereof to be moved downwardly to compress the spring 46 associated with the selector element D of the first speed device, the actuating end 42 being moved to a position of arcuate alignment with the bus bar 45 as a center, with the socket 41 of the link 38 associated with the first speed braking device 22. The solenoid coil 197, as well as the other corresponding solenoid coils, requires only a relatively small amount of current to produce the downward movement of the respective selector rods 43 against the resistance of the several springs 46, and where the selector elements D are positioned so as to overlie the associated levers 38, as in the aforesaid neutral position, the solenoid 54a, for example, in the foregoing assumed illustration, may be energized before the controlling mechanism swings the bus bar 45 so as to move the selector elements D to a position as shown in Fig. 4. However, in such instance, the first speed selector rod 43 will merely be moved downwardly against the upper surface of the outwardly projecting end of lever 38, the force of solenoid 54a not being sufficient to apply the braking device under such conditions by reason of the greater resistance of the brake shoe expanding spring 35. Thus under such conditions, just as soon as the vacuum operating cylinder E acts to rock the bus bar 45 to position the selector elements D as shown by the dotted lines in Fig. 4, the solenoid 54a being continuously energized under such conditions, the first speed selector rod or plunger 43 will slide off the end of the lever 38 so as to produce the aforesaid arcuate alignment of the actuating rod end 42 with the socket 41 at the end of lever 38.

As the vacuum operating cylinder E nears the completion of its power stroke, the rod or link 64 moving forwardly as viewed in Fig. 2, the kickoff 188 actuates the end 189 of the conductor 165, the conductor 165 being sprung so as to move the stop 178 (referring now to Fig. 13) and separate the contacts 172 and 173, it being understood that the conductor 174 springs so as to follow this movement of stop 178. Thus, when the circuit is broken from ground 175 through conductor 174, the contact points 166, 167 are respectively separated and the solenoid 139 is immediately de-energized together with a de-energization of the electro-magnet 161.

On de-energization of the solenoid 139, the spring 142 associated with the solenoid core 140 moves the solenoid core 140 downwardly so as to restore the throttle valve 17 under control from the accelerator pedal and link 138 and to also close off communication between the riser 13 and the vacuum operating cylinder E.

When the vacuum is thus closed off from the vacuum operating cylinder E, the springs 68 and 80 will immediately act to rock the bus bar 45 in the opposite direction of rotation from that produced by the action of the vacuum cylinder E, the bus bar being thus rocked counterclockwise so as to swing all of the selector elements D toward the brake controlling devices. Now, in the foregoing assumed illustration, I have pointed out that the first speed selector actuating solenoid 54a was energized so as to depress the end 42 of only this first speed selector element D. Therefore, during the counterclockwise rotation of bus bar 45 under the influence of springs 68 and 80, the actuating end 42 of the first speed selector element will be caused to engage the socket 41 of lever 38 associated with the first speed braking device 22. In this manner the first speed braking device 22 is energized to hold the drum 28 associated therewith stationary so as to produce a drive from the engine to the shaft 10 in the first speed gear ratio.

In the operation of the system as previously described, the selector contact arm 96 has been moved by the selector arm 85 from the neutral position into a position for establishing actuation of the first speed brake controlling device 22, the contact piece 98 being then in contact with the point 104 so as to maintain an electrical circuit through the first speed solenoid 54a as long as the selector arm 85 is left in the first speed notch 90. If desired, this circuit to the first speed solenoid 54a may be broken after the bus bar 45 has been rocked by springs 68 and 80 to actuate the first speed braking means inasmuch as the first speed selector arm 43 will not move upwardly under the action of spring 46 as long as the bus bar 45 is held in the actuated position under the influence of the said springs 68 and 80. However, inasmuch as the current flowing through the selector actuating solenoids is relatively small, I have deemed it unnecessary to provide or illustrate any means for interrupting the selector solenoid circuits after establishment of the respective gear speed ratios of the transmission C. When the bus bar 45 is actuated by the vacuum operating cylinder E to clear the selector elements D from their associated levers 38 of the respective braking means, outward movement of the levers 38 under the influence of their associated springs 35 is limited by a suitable stop 201 which may be in the form of a bar extending longitudinally of the transmission as best shown in Figs. 4 and 3.

Assuming now that the operator desires to move the selector arm 85 into the second speed notch 91 from the aforesaid first speed notch 90 in the foregoing assumed illustration, the cycle heretofore set forth in detail will not be repeated inasmuch as such movement of the selector arm 85 will cause the selector contact arm 96 to interrupt the circuit through the first speed solenoid 54a, the contact piece 97 wiping across the contact point 111 to energize the relay F, the contact piece 98 then being brought to rest in engagement with the contact point 105 to energize the second speed selector solenoid 54b.

Thus, when the first speed solenoid 54a is de-energized, the solenoid core 55 associated therewith is retracted by a suitable spring (not illustrated) so that the first speed selector actuating rod 43 is free to move upwardly under the influence of its spring 46 just as soon as the relay F causes energization of solenoid 139 to close the throttle valve 17 and actuate the vacuum controlling valve 150 to produce a vacuum in the vacuum cylinder E and to thereupon swing the bus bar 45 into the dotted line position illustrated in Fig. 4. When the bus bar 45 is so moved, the spring 46 of the first speed selector element D is then free to move the head 47 upwardly into its limiting position in engagement with the core 55 of the first speed solenoid 54a.

Meantime the second speed solenoid 54b has been energized to move the selector actuating rod 53 thereof downwardly so as to arcuately align the actuating end 42 with the lever 38 associated with the second speed brake controlling device 23.

At the end of the stroke produced by the vacuum actuating cylinder E, the kick-off 188 interrupts the relay circuit established by contacts 172 and 173 so that the engine throttle valve 17 is restored to a position determined by the actuation of the accelerator pedal and the supply of vacuum is cut off to the vacuum cylinder E whereupon the springs 68 and 80 will actuate the bus bar 45 in the opposite direction to actuate the braking means associated with the second speed device 23.

It will be readily understood that the above cycle is repeated during each manipulation of the selector arm 85 and furthermore that this arm 85 may be readily actuated into any of its positions determined by the notches provided to receive the selector arm and carried by the selector segment 89.

In actual practice the aforesaid automatic cycle is completed in a very small amount of time and the manipulation of transmission C to change gear ratios may be effected in a fraction of a second if desired in actual practice. If desired, the bus bar 45 may be manually released in a manner similar to the release established by actuation of the vacuum controlling cylinder E, by manual actuation of the foot pedal 71 which, as aforesaid, actuates the cross shaft 67 leading to the bus bar 45.

Referring now to the modified form of my invention illustrated in Fig. 14, it will be noted by comparison of the controlling mechanism diagrammatically illustrated therein with that shown in Fig. 12, that the Fig. 14 embodiment dispenses with the relay F and solenoid 139 of Fig. 12. In Fig. 14 the selector elements are controlled by the same aforesaid selector actuating solenoids by the same manipulation of the selector contact arm 96 as will be noted from the use of the same reference characters as referred to hereinbefore. Furthermore, the same vacuum operating cylinder E is employed and the engine throttle valve 17 is adapted to be actuated by the foot accelerator pedal as before. However, in Fig. 14, the changes in the transmission speed ratios are not automatically responsive to manipulation of the selector arm 85 but in Fig. 14 the selector arm 85 is adapted to preselect the gear ratios of the transmission C in advance of their actual manipulation which is effected by manual movement of a further button or pedal designated at 202.

The pedal 202 acts through linkage 203, 204 to move the compensating lever 121 in the same manner as this compensating lever was actuated by the solenoid core 140 in the Fig. 12 embodiment. Thus, after the selector arm 85 has been actuated to the desired position, the vehicle operator depresses the pedal 202, this pedal being held until the cycle of changing the desired gear ratio has been effected. When the pedal 202 is depressed, the engine throttle valve 17 is closed independently of the accelerator pedal position, the vacuum in riser 13 being likewise introduced to the vacuum operating cylinder E so as to clear the bus bar and, on release of the pedal 202, the aforesaid springs 68 and 80 will serve to return the bus bar to its braking position to apply or actuate any of the brake controlling devices according to the previous setting of the selector arm 85 as will be readily understood.

Referring now to the modified embodiment of my invention illustrated in Fig. 15, I have shown therein a fully automatic system for effecting the gear ratio changes of the transmission C, this system dispensing with the relay F of Fig. 12 but including the solenoid 139 of Fig. 12. In Fig. 15 the solenoid 139 is adapted to be momentarily energized by the aforesaid second series contact points 110 to 114 inclusive whereby to effect a circuit through the solenoid 139 as the contact arm 96 wipes across the second series contact points in moving from one of its positions determined by selector arm 85 to another of said positions. In this manner the solenoid 139 is momentarily energized to raise the solenoid core 140 against the action of the aforesaid spring 142 so as to momentarily close the engine throttle valve 17 and actuate the vacuum controlling valve 150 to supply vacuum to the vacuum actuating cylinder E. Inasmuch as the circuit to the solenoid 139 is established only momentarily as the selector contact arm 96 wipes across the contact points of the aforesaid second series, I have provided means for delaying the restoring downward movement of the solenoid core 140 after temporary energization of the solenoid 139, this delay being sufficiently long to provide the necessary time for the vacuum control cylinder E to clear the bus bar 45, the selector elements D meantime adjusting themselves under control of their respective selector actuating solenoids so that the parts are ready for actuation by bus bar 45 under influence of springs 68 and 80.

In Fig. 15 this delay in restoring the downward movement of the solenoid core 140 is produced by a dashpot cylinder 205 having a piston 206 carried with the solenoid core 140. The dashpot cylinder 205 has an air outlet 207 at the bottom thereof controlled by a valve 208 in valve casing 209, the latter having the outlet vent 210. The valve 208 is yieldingly urged to its closed position by a spring 211, an adjustable valve stop 211ᵃ controlling the movement of valve 208 toward its seat and hence regulating the time required for downward movement of piston 206 in displacing the air therebelow. The solenoid core 140 is freely movable upwardly in cylinder 205 by reason of a vent 211ᵇ located through the upper end of the cylinder 205. The control system illustrated in Fig. 15 is otherwise identical to that illustrated and described in connection with Fig. 12, it being apparent that in Fig. 15 the gear ratio changes of transmission C are effected automatically in response to adjustment of the selector arm 85, the dashpot cylinder 205 providing the necessary delay in closing off the vacuum supply to the vacuum actuating cylinder E and restoring the engine throttle valve 17 to the position thereof under control of the aforesaid accelerator pedal.

In Fig. 15 the electrical circuit to the solenoid 139 is produced as follows: From ground 212 through the aforesaid storage battery 179, thence through conducting wire 213 to the selector contact arm 96. The circuit then passes through any one of the aforesaid series contact points 110 to 114 inclusive, the circuit then passing through the wire 214 to the solenoid 139 and thence back to the ground 215 by the wire 216.

Referring now to the embodiment of my invention illustrated in Fig. 16, it will be noted that I have dispensed with the aforesaid solenoid 139 as well as the aforesaid relay F. The control system illustrated in Fig. 16 is of the preselector type wherein manipulation of the selector arm 85 does not produce actuation of the complete cycle of gear changes but, like the Fig. 14 embodiment, merely controls the selector actuating solenoids associated with the various selector elements D, a further manual movement on the part of the vehicle operator being necessary to close the engine throttle valve and open the vacuum established in the engine intake system to the vacuum actuating cylinder E.

In Fig. 16 I have illustrated the usual accelerator pedal 217 as extending through linkage 218, 219 and 220 for connection to the engine throttle valve 17 and the aforesaid vacuum controlling valve 150. In the control system thus illustrated, the vacuum established in the intake system of the engine is placed in communication with the vacuum cylinder E whenever the accelerator pedal 217 is released to its position for engine idling. Such movement, as customary, also closes the engine throttle valve 17.

Thus, in operation of the control system illustrated in Fig. 16 the vehicle driver preselects any desired gear ratio by reason of the selector arm 85 and, on release of the accelerator pedal 217, the throttle valve 17 will be closed and the vacuum control valve 150 will simultaneously be manipulated to the position illustrated in Fig. 16 for opening the vacuum of the engine intake system to the vacuum control cylinder E whereupon the bus bar 45 will be actuated against the influence of the aforesaid springs 68 and 80 to clear the bus bar from its position of actuation for the various braking control devices of the transmission. When the accelerator pedal 217 is then depressed, the engine throttle valve 17 will be moved toward its open position and simultaneously therewith the vacuum control valve 150 will be moved so as to close off communication between the engine intake system and the vacuum actuating cylinder E, the aforesaid springs 68 and 80 being then free to move the bus bar 45 in the opposite direction for actuating whichever of the brake controlling devices is desired by a preselection of the selector arm 85.

Referring now to the embodiment of my invention which is illustrated in Fig. 17, it will be noted that the system includes the aforesaid relay F as well as the aforesaid solenoid 139 although these devices are arranged for energization independently of adjustment of the selector arm 85. The control system of Fig. 17 is therefore somewhat of a combination of the control system shown in Fig. 12 and the control system illustrated in Fig. 14 as will be apparent from the following description of the operation thereof.

In Fig. 17 the various selector actuating solenoids are energized in the same manner and for the same purpose by reason of adjustment of the selector contact arm 96 as aforesaid. However, in Fig. 17 I have dispensed with the contact piece 97 and the aforesaid second series of contact points 110 to 114 inclusive, these parts being replaced by a switch comprising contact points 221 and 222, the former extending through a wire 223 to the relay F, and the latter contact 222 being carried by a button or lever 224 which is manually actuable for momentarily establishing the desired contact between the points 221 and 222. Thus, the wire 223 leading to the relay F takes the place of the wire 184 of Fig. 13 which, in Fig. 13, extended to the various contact points of the second series indicated at 110 to 114 inclusive. In like manner the wire 225 of Fig. 17 which leads to the ground 180 and also to the storage battery 179, takes the place of the aforesaid wire 186 of Fig. 13. The control system illustrated in Fig. 17 operates in very much the same manner as that described in connection with Figs. 12 and 13 with the exception that after a gear ratio has been selected by adjustment of the selector arm 85, the engine throttle valve 17 and the vacuum operating cylinder E are not actuated automatically in response to the said adjustment of the selector arm 85 but such actuation is effected by manual manipulation of the button or lever 224 to momentarily close the circuit provided by the contact switch points 221, 222. In this manner the relay F has its aforesaid circuits momentarily established so that when the manual lever 224 is released, the relay F will be continued in respect of its energization until the circuits are interrupted by the aforesaid kick-off 188 in order to restore the throttle valve 17 under control of the accelerator pedal and to simultaneously actuate the vacuum control valve 150 to close off the supply of vacuum from the engine intake to the vacuum operating cylinder E. The control system of Fig. 17 therefore operates in a manner generally similar to that explained in connection with Figs. 12 and 13, with the exception that in Fig. 17 the gear changes of the transmission C are not automatically produced by manual manipulation of the selector arm 85 but are rather dependent on a further manual movement of the lever 224 in momentarily closing the switch provided by the points 221, 222.

I desire to point out that I do not limit my invention, in the broader aspects thereof, to any particular combination and arrangement of parts such as shown and described for illustrative purposes in the several embodiments hereinbefore referred to, since various modifications will be apparent from the teachings of my invention and within the scope thereof as defined in the appended claims.

What I claim is:

1. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, and spring operated means for actuating said common actuating means.

2. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, and means responsive to manipulation of said manual selector means for controlling operation of said vacuum operated means.

3. In a change speed transmission, a plurality of transmission speed ratio controlling devices adapted for selective operation to vary the speed ratio drive through the transmission, selector actuating solenoids respectively associated with said controlling devices, selector elements respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, and manually actuable means operable independently of said manual selector means for controlling operation of said vacuum operated means.

4. In a change speed transmission of the planetary gear type, a plurality of planetary gear sets having rotary drums respectively driven thereby, braking devices respectively for said rotary drums and adapted to selectively arrest rotation of said drums to vary the speed ratio drive through the transmission, selector actuating solenoids respectively associated with said braking devices, selector elements respectively actuated by said selector actuating solenoids into positions for actuating said braking devices respectively, common actuating means for actuating said braking devices respectively through said selector elements, manually operated selector means for selectively energizing said selector actuating solenoids, vacuum operated means for releasing said common actuating means, and spring operated means for actuating said common actuating means.

5. In a change speed transmission of the planetary gear type, a plurality of planetary gear sets having rotary drums respectively driven thereby, braking devices respectively for said rotary drums and adapted to selectively arrest rotation of said drums to vary the speed ratio drive through the transmission, selector actuating solenoids respectively associated with said braking devices, selector elements respectively actuated by said selector actuating solenoids into positions for actuating said braking devices respectively, common actuating means for actuating said braking devices respectively through said selector elements, manually operated selector means for selectively energizing said selector actuating solenoids, vacuum operated means for releasing said common actuating means, spring operated means for actuating said common actuating means, and means responsive to manipulation of said manual selector means for controlling operation of said vacuum operated means.

6. In a change speed transmission of the planetary gear type, a plurality of planetary gear sets having rotary drums respectively driven thereby, braking devices respectively for said rotary drums and adapted to selectively arrest rotation of said drums to vary the speed ratio drive through the transmission, selector actuating solenoids respectively associated with said braking devices, selector elements respectively actuated by said selector actuating solenoids into positions for actuating said braking devices respectively, common actuating means for actuating said braking devices respectively through said selector elements, manually operated selector means for selectively energizing said selector actuating solenoids, vacuum operated means for releasing said common actuating means, spring operated means for actuating said common actuating means, and manually actuable means operable independently of said manual selector means for controlling operation of said vacuum operated means.

7. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, and means including an electric relay adapted to electrically control the operation of said vacuum operated means.

8. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, means including an electric relay adapted to electrically control the operation of said vacuum operated means, and means for energizing said relay.

9. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, means including an electric relay adapted to electrically control the operation of said vacuum operated means, and means responsive to manipulation of said manual selector means for energizing said relay.

10. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, means including an electric relay adapted to electrically control the operation of said vacuum operated means, means for energizing said relay, and means responsive to operation of said vacuum operated means for de-energizing said relay.

11. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, and means including a solenoid for controlling operation of said vacuum operated means.

12. In a change speed transmission, a plurality of transmission speed ratio controlling devices adapted for selective operation to vary the speed ratio drive through the transmission, selector actuating solenoids respectively associated with said controlling devices, selector elements respectively actuated by said selector actuating solenoids into positions for actuating said controlling devices respectively, common actuating means for actuating said controlling devices respectively through said selector elements, manually operated selector means for selectively energizing said selector actuating solenoids, vacuum operated means for releasing said common actuating means, spring operated means for actuating said common actuating means, means including a solenoid for controlling operation of said vacuum operated means, and dashpot means associated with said solenoid for controlling the operation thereof.

13. In an engine driven motor vehicle power transmission, a change speed transmission having a plurality of speed ratio controlling devices adapted for selective operation to vary the speed ratio drive through the transmission, a plurality of selector elements associated with said controlling devices respectively, manually operated selector means for selectively actuating said selector elements, common means for actuating said controlling devices under control of said selector elements, vacuum operated means including a vacuum operating cylinder for actuating said common actuating means, and valve controlled means for placing said vacuum operating cylinder in communication with the intake system of said engine in response to manipulation of said manually operated selector means.

14. In an engine driven motor vehicle power transmission, a change speed transmission having a plurality of speed ratio controlling devices adapted for selective operation to vary the speed ratio drive through the transmission, a plurality of selector elements associated with said controlling devices respectively, manually operated selector means for selectively actuating said selector elements, common means for actuating said controlling devices under control of said selector elements, vacuum operated means including a vacuum operating cylinder for actuating said common actuating means, and means for simultaneously closing the engine throttle valve and placing said vacuum operating cylinder in communication with the engine intake system.

15. In an engine driven motor vehicle power transmission, a change speed transmission having a plurality of speed ratio controlling devices adapted for selective operation to vary the speed ratio drive through the transmission, a plurality of selector elements associated with said controlling devices respectively, manually operated selector means for selectively actuating said selector elements, common means for actuating said controlling devices under control of said selector elements, vacuum operated means including a vacuum operating cylinder for actuating said common actuating means, and means for simultaneously closing the engine throttle valve and placing said vacuum operating cylinder in communication with the engine intake system in response to manipulation of said manually operated selector means.

16. In an engine driven motor vehicle power transmission, a change speed transmission having a plurality of speed ratio controlling devices adapted for selective operation to vary the speed ratio drive through the transmission, a plurality of selector elements associated with said controlling devices respectively, manually operated selector means for selectively actuating said selector elements, common means for actuating said controlling devices under control of said selector elements, vacuum operated means including a vacuum operating cylinder for actuating said common actuating means, means for simultaneously closing the engine throttle valve and placing said vacuum operating cylinder in communication with the engine intake system, and manually operated means for controlling the last said means independently of said manually operated selector means.

17. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, power operating means adapted to selectively operate said braking devices, a manually shiftable selector element, and electrically operating means for effecting operation of said power operating means to vary said speed ratio in response to manual shifting of said selector element.

18. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, power operating means including engine vacuum operating means adapted to selectively operate said braking devices, means including a manually shiftable selector element for selectively controlling the operation of said braking devices by said power operating means, and means responsive to manual shifting of said selector element for controlling the operation of said power operating means whereby to vary said speed ratio in response to shifting of said selector element.

19. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio.

20. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio, said power operating means including a fluid pressure operator adapted to operate said operating element in at least one of its directions of reciprocation.

21. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for effecting operation of said selector operating means and said power operating means to vary said speed ratio, said power operating means including a spring adapted to operate said operating element in at least one of its directions of reciprocation.

22. In an engine driven change speed transmission of the planetary gear type, a plurality of planetary gear sets having rotary control elements driven thereby, braking devices respectively for said control elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio, said power means including a fluid pressure operator and a spring respectively adapted to operate said operating element in its directions of reciprocation.

23. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio, said power means including a fluid pressure operator and a spring respectively adapted to operate said operating element in its directions of reciprocation, one of said directions of reciprocation of said operating element acting to release any previously arrested rotary element and the other of said directions of reciprocation of said operating element acting to arrest another of said rotary elements corresponding to the speed ratio setting of said shiftable selector element.

24. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio, said selector element having a plurality of positions of speed ratio control between which positions said selector element is adapted for substantially continuous manual shifting as aforesaid, said power operating means being controlled by said selector element during shifting movement thereof to a position intermediate a plurality of pairs of said positions of speed ratio control.

25. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a reciprocatory operating element, power operating means for reciprocating said operating element, a shiftable selector element, and means responsive to shifting of said selector element for controlling the operation of said selector operating means and said power operating means to vary said speed ratio, said selector element having a plurality of positions of speed ratio control between which positions said selector element is adapted for substantially continuous manual shifting as aforesaid, said power operating means being controlled by said selector element during shifting movement thereof to a position intermediate a plurality of pairs of said positions of speed ratio control, said braking devices being selectively connected to said reciprocatory operating element in response to said shifting movement of said selector element between a plurality of pairs of said positions of speed ratio control and subsequently to movement of said selector element to said intermediate positions.

26. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, power means including a reciprocating power operating element, means including a plurality of selector connecting elements adapted to selectively provide an operating connection between said power operating element and said braking devices, manually operated means including a manually shiftable selector element adapted to control operation of said power means and said selector connecting elements, and means acting in response to shifting of said selector element to delay the reciprocation of said power operating element until adjustment of said selector connecting elements has taken place.

27. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, power means including a reciprocating power operating element, means including a plurality of selector connecting elements adapted to selectively provide an operating connection between said power operating element and said braking devices, manually operated means including a manually shiftable selector element adapted to control operation of said power means and said selector connecting elements, and means acting in response to said manually operated means to delay the reciprocation of said power operating element until adjustment of said selector connecting elements has taken place.

28. In an engine driven change speed transmission of the planetary gear type, a plurality of forwardly driving and reversing planetary gear sets having rotary control elements driven thereby, braking devices respectively for said rotary elements and adapted to selectively arrest rotation of said rotary elements to vary the speed ratio drive through the transmission, power means for operating said braking devices and including a motor operated by the engine vacuum, said power operating means further including an operating element adapted to selectively operably connect said braking devices with said power operating means, and manually operable speed ratio controlling means including means for selectively operably connecting said operating element with said braking devices.

29. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, means for operating said braking devices and including a motor operated by the engine vacuum, manually operable speed ratio controlling means including means for selectively operably connecting said operating means with said braking devices, and valve operating means including a valve for controlling the communication of engine vacuum to said motor in response to operation of said manually operable means.

30. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, means for operating said braking devices and including a motor operated by the engine vacuum, manually operable speed ratio controlling means including means for selectively operably connecting said operating means with said braking devices, and valve operating means including a valve for controlling the communication of engine vacuum to said motor in response to operation of said manually operable means, said valve operating means including means for effecting a control on said valve whereby said selectively operable connecting means effects a change in said operating connections for said braking devices during the interval between opening and closing movements of said valve.

31. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, means for operating said braking devices and including a motor operated by the engine vacuum, said engine having a throttle valve, valving means controlling the communication of engine vacuum to said motor, and manually operable speed ratio controlling means adapted to selectively operably connect said brake device operating means with said braking devices and to effect correlated operation of said throttle valve and valving means.

32. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, means for operating said braking devices and including a motor operated by the engine vacuum, means for selectively operably connecting said operating means with said braking devices, and a manually operable selector element adapted to control the operation of said selective connecting means and said vacuum motor.

33. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, means for operating said braking devices and including a motor operated by the engine vacuum, said engine having a throttle valve, valving means controlling the communication of engine vacuum to said motor, means for selectively operably connecting said operating means with said braking devices, and a manually operable selector element adapted to control the operation of said selective connecting means and said throttle valve and valving means.

34. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, solenoid operated means selectively connectible with said braking devices, power operating means for actuating said braking devices through the intermediary of said solenoid operated means, and manually operable means for controlling the operation of said solenoid operated means and said power operating means.

35. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, power operating means including an operating element adapted to selectively operate said braking devices, solenoid operated selector connecting elements adapted for movement to selectively operably connect said operating element with said braking devices, and manually operable means for controlling the operation of said solenoid operated elements and said power operating means.

36. In a power transmission adapted for operation by an engine having a throttle valve, power operating means including a vacuum operated motor, means operated by said power operating means for manipulating said transmission, manually controlled means for adjusting said throttle valve, valving means controlling the communication of said vacuum to said motor, and manually operable means for operating said valving means and closing said throttle valve independently of said throttle valve adjusting means.

37. In a power transmission adapted for operation by an engine having a throttle valve, power operating means including a vacuum operated motor, means operated by said power operating means for manipulating said transmission, manually controlled means for adjusting said throttle valve comprising an element manually movable to open said throttle valve, valving means controlling the communication of said vacuum to said motor, and manually controlled operating means for operating said valving means and closing said throttle valve independently of said throttle valve adjusting means whereby said manually controlled operating means will close said throttle valve even though said manually movable element is positioned to open said throttle valve.

38. In a motor vehicle transmission having a plurality of speed ratio controlling devices, power operating means including a fluid pressure operating motor for selectively operating said controlling devices, selector operating means adapted to selectively establish an operating connection between said power operating means and said controlling devices, fluid pressure valving means controlling said motor, electrically energized means for operating said valving means, a manually operable selector element adapted for manual adjustment to a plurality of stations of transmission control, means for inducing operation of said electrically energized means in response to movement of said selector element from one of said stations to another, and means for operating said selector operating means in response to movement of said selector element from one of said stations to another.

39. In a motor vehicle transmission having a plurality of speed ratio controlling devices, power operating means including a fluid pressure operating motor for selectively operating said controlling devices, selector operating means adapted to selectively establish an operating connection between said power operating means and said controlling devices, fluid pressure valving means controlling said power operating means, electrically energized means for operating said valving means, a manually operable selector element adapted for manual adjustment to a plurality of predetermined stations of transmission control, means associated with each of said stations for inducing a control on said electrically energized means when said selector element is adjusted from one of said stations to another, and means responsive to adjustment of said selector element from one of said stations to another for operating said selector operating means.

40. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, electric circuit means for energizing said solenoid, electrical switch means controlling said electric circuit means, and means responsive to movement of said element between each of said stations for operating said switch means.

41. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, electrical switch controlled means for inducing operation of said solenoid in response to movement of said element between each of said stations, and means responsive to movement of said selector element between said stations for selectively operably connecting said power operator means with said controlling devices.

42. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, primary and secondary electrical circuits, switch means operable by energizing said primary circuit for closing said second circuit, said secondary circuit including said solenoid, additional switch means controlling said primary circuit, and means responsive to movement of said element between each of said stations for operating said additional switch means.

43. In a motor vehicle transmission of the planetary gear type having a plurality of planetary gear operated rotary controlling elements, means respectively associated with said rotary elements and adapted for operative engagement therewith to control the drive through the transmission, means including a power operator for selectively operating said element engaging means, means including a solenoid for controlling operation of said power operator, an adjustable selector element adapted for movement to a plurality of predetermined stations of transmission control, and electrical switch controlled means for inducing operation of said solenoid in response to movement of said selector element between each of said stations.

44. In a motor vehicle transmission of the planetary gear type having a plurality of planetary gear operated rotary controlling elements, means respectively associated with said rotary elements and adapted for operative engagement therewith to control the drive through the transmission, power operating means for selectively operating said element engaging means, means including a solenoid for controlling operation of said power operating means, an adjustable selector element adapted for movement to a plurality of predetermined stations of transmission control, electrical switch controlled means for inducing operation of said solenoid in response to movement of said selector element between each of said stations, and means responsive to movement of said selector element between stations for selectively operably connecting said power operating means with said element engaging means.

45. In a transmission having a plurality of speed ratio controlling devices, means for selectively operating said devices, a fluid pressure actuated device operably connected to said selective operating means, a valve controlling fluid pressure delivery to said fluid pressure device, a solenoid actuator operably connected to said valve, an adjustable selector element adapted for movement to a plurality of predetermined stations of control, means responsive to movement of said selector element between each of said stations for energizing said solenoid, and means responsive to movement of said selector element between said stations for controlling the selective operation of said devices by said selective operating means.

46. In a motor vehicle transmission of the planetary gear type having a plurality of planetary gear operated rotary controlling elements, means respectively associated with said rotary elements and adapted for operative engagement therewith to control the drive through the transmission, power operating means for selectively operating said element engaging means, a manually adjustable selector element adapted for movement to produce speed ratio changes in the transmission in response to adjustment of said selector element, and means operating to control selective operation of said power operating means in response to selective adjustment of said selector element, said controlling means including an electrically operating device energized in response to manual adjustment of said selector element.

47. In a motor vehicle power transmission, a rotatable transmission drive controlling member, a device adapted to frictionally engage said rotatable drive controlling member, a pressure fluid operable motor adapted to operate said device in frictional engagement with said rotatable drive controlling member, valving means controlling pressure fluid delivery to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control, additional transmission drive control means adapted for selective manipulation in response to shift of said selector element, and means operating in response to shift of said selector element when said friction device is engaged to effect energization of said solenoid and manipulation of one of said additional drive control means.

48. In a motor vehicle power transmission, a rotatable transmission drive controlling member, a device adapted to frictionally engage said rotatable drive controlling member, a pressure fluid operable motor adapted to operate said device in frictional engagement with said rotatable drive controlling member, valving means controlling pressure fluid delivery to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control, additional transmission drive control means adapted for selective manipulation in response to shift of said selector element, switch means controlling energization of said solenoid and adapted for operation in response to shift of said selector element between each of said drive control stations, and means operating in response to shift of said selector element between each of said drive control stations for operating said switch means and to thereafter effect manipulation of one of said additional transmission drive control means.

49. In a motor vehicle power transmission, planetary gearing including a rotatable transmission drive controlling member, a device adapted to frictionally engage said rotatable drive controlling member, a pressure fluid operable motor adapted to operate said device in frictional engagement with said rotatable drive controlling member, valving means controlling pressure fluid delivery to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control means adapted for selective manipulation in response to shift of said selector element, and means operating in response to shift of said selector element when said friction device is engaged to effect energization of said solenoid and manipulation of one of said additional drive control means.

50. In a motor vehicle power transmission, driving and driven shafts, planetary gearing operable between said shafts for driving the driven shaft from the driving shaft, said planetary gearing including a rotatable control gear thereof adapted to be held from rotation to provide said drive and to be released for rotation to release said drive, holding means selectively operable to hold said control gear against rotation or to release said control gear for rotation, a driver manipulated drive control element, means including a solenoid for controlling said selective operation of said holding means in response to driver manipulation of said control element, said controlling means including means operable in response to said driver manipulation of said control element for controlling energization of said solenoid.

51. In a motor vehicle power transmission, gearing means providing a plurality of transmission drives, said gearing means including planetary gearing for at least one of said drives, a plurality of control means for said gearing means selectively operable to provide each of said drives, the control means for providing said planetary gearing drive including a friction operator and a solenoid controlled pressure fluid operated motor therefor, a driver operable selector element shiftable between a plurality of stations of transmission control respectively corresponding to said transmission drives, and means operable in response to driver shift of said selector element for effecting selective operation of said plurality of control means.

HERBERT F. PATTERSON.